United States Patent
Pispa

(10) Patent No.: US 7,141,947 B2
(45) Date of Patent: Nov. 28, 2006

(54) BRAKING CHOPPER

(75) Inventor: Matti Pispa, Isokyrö (FI)

(73) Assignee: Vacon Oyj, Vaasa (FI)

( * ) Notice: Subject to any disclaimer, the term of this patent is extended or adjusted under 35 U.S.C. 154(b) by 0 days.

(21) Appl. No.: 11/311,334

(22) Filed: Dec. 20, 2005

(65) Prior Publication Data

US 2006/0132073 A1   Jun. 22, 2006

(30) Foreign Application Priority Data

Dec. 21, 2004   (FI) ................................ 20041642

(51) Int. Cl.
*H02P 3/12*   (2006.01)
*H02P 3/22*   (2006.01)

(52) U.S. Cl. ................. 318/380; 318/379; 318/375

(58) Field of Classification Search ............ None
See application file for complete search history.

(56) References Cited

U.S. PATENT DOCUMENTS

| | | | | |
|---|---|---|---|---|
| 6,175,204 B1* | 1/2001 | Calamatas | ............... | 318/375 |
| 2003/0223738 A1* | 12/2003 | Hughes et al. | ............... | 388/800 |
| 2004/0145337 A1* | 7/2004 | Morishita | ............... | 318/801 |
| 2004/0227479 A1* | 11/2004 | Youm | ............... | 318/375 |

FOREIGN PATENT DOCUMENTS

| | | |
|---|---|---|
| FI | 75070 B | 12/1987 |
| JP | 60-66690 A | 4/1985 |
| JP | 6-90578 A | 3/1994 |
| SU | 748751 A1 | 7/1980 |

* cited by examiner

*Primary Examiner*—Lincoln Donovan
*Assistant Examiner*—Erick Glass
(74) *Attorney, Agent, or Firm*—Birch, Stewart, Kolasch & Birch, LLP

(57) ABSTRACT

A braking chopper for dissipating braking power away from the direct-current rails of an AC drive system, said braking chopper being an inverter unit (INU) physically similar to those also used as motor supply devices, consisting of upper- and lower-branch controllable semiconductor switches (V1–V6), wherein the inverter is connected by its output connectors to the direct-current rails (DC) via a resistor unit, which resistor unit contains two resistors (R1, R2), of which the first is connected to the positive direct-current rail (DC+) and the second to the negative direct-current rail (DC−), wherein both lower-branch and upper-branch semiconductor switches are turned on during braking, and wherein one brake resistor is controlled by the lower-branch switch of only one phase and the second brake resistor by the upper-branch switch of another phase.

4 Claims, 1 Drawing Sheet

BRAKING CHOPPER

BACKGROUND OF THE INVENTION

1. Field of the Invention

The present invention relates to a braking chopper for dissipating braking power away from the direct-current rails of an AC drive system, said braking chopper being an inverter unit physically similar to those used in normal motor supply applications.

2. Description of Background Art

Braking choppers are normally used in large AC drive systems where rectifier units (REC) connected to a supply network are connected via direct-current rails to inverter units (INU) controlling motors (FIG. 1). When the summed power of the INUs is negative, i.e. when the motors or at least some of them are braking, the braking power has to be dissipated away from the direct-current rails to avoid overvoltage. The commonest solution is to feed the braking power via a chopper into a braking resistor R (FIG. 2).

Prior-art braking chopper solutions are presented in FIG. 2:

1. A chopper unit BRC specifically designed for the purpose, with a power semiconductor switch V1 that starts to conduct when the voltage in the DC rails exceeds a set limit, and 2. A conventional INU with a special program loaded in it to accomplish a braking chopper function. In the example solution in FIG. 2, the INU is an inverter bridge in which the lower-branch power semiconductor switches V4 . . . V6 are connected in parallel to perform the same function as the switch in the BRC. Thus, no upper-branch switches are used in this solution at all. The use of a conventional INU as a braking chopper is a good solution e.g. in respect of maintenance and spare parts because it is a standard unit physically identical to those used as motor controllers.

The inverter units are designed and rated to serve as motor supply devices. In this application a considerable proportion, e.g. 40%, of the losses occurring in the power semiconductor switches consists of switching losses arising in switching situations. The amount of switching losses is influenced by the switching frequency and the inductivity of the load current, among other things. The load current of the motor is normally inductive, which adds to the switching losses.

In a braking chopper application, the load current is almost purely resistive and also the required switching frequency is considerably lower than in a motor drive. Therefore, the load of the power semiconductor switches in the prior-art solution is very low and thus the limit to the power to be fed into the braking resistor is set by the wiring and connections, which are designed in accordance with the needs of a motor application.

BRIEF SUMMARY OF THE INVENTION

According to the present invention, the braking chopper is an inverter unit consisting of upper- and lower-branch controllable semiconductor switches that is physically identical to devices also used as motor supply devices where an inverter unit is connected by its output connectors to the direct-current rails (DC) via a resistor unit. In the solution of the invention, the braking power handling capacity of the INU functioning as a braking chopper is doubled by using power semiconductor switches of both branches of the bridge in braking, by controlling one brake resistor by the lower-branch switch of only one phase and another brake resistor by the upper-branch switch of another phase.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE PREFERRED EMBODIMENTS

Figure 1:
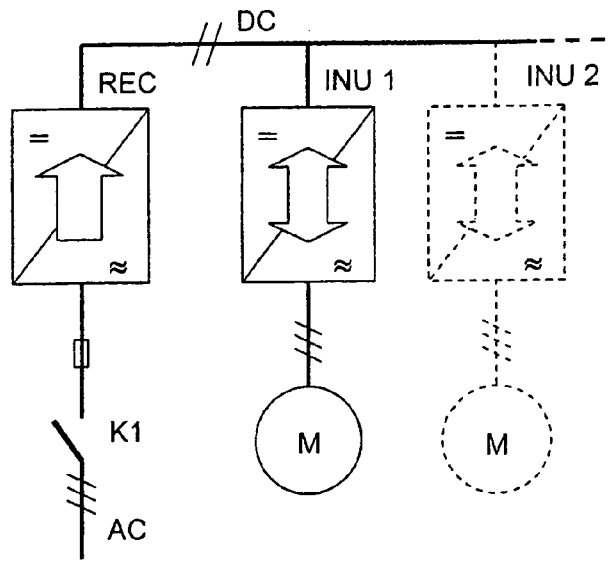
FIG. 1 presents an AC drive system.
Figure 2:
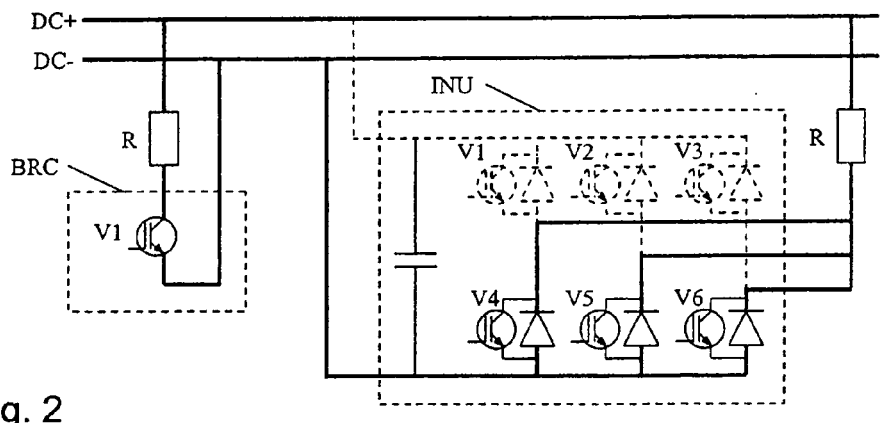
FIG. 2 presents prior-art braking chopper solutions.

FIG. 1 presents an example of an AC drive system. It comprises a rectifier unit REC, which produces from the three-phase alternating voltage of the supply network AC a direct voltage DC, which is connected to several inverter units INU1, INU2 and so on, each feeding a motor. The rectifier unit may be of a type that can feed power in one direction only. In such a case, if the summed power of the INUs is negative, then the direct voltage in the DC circuit starts to rise. A normal solution to avoid overvoltage in this situation is to use a braking chopper in the direct-current circuit to feed the negative power into a brake resistor.

Figure 3:
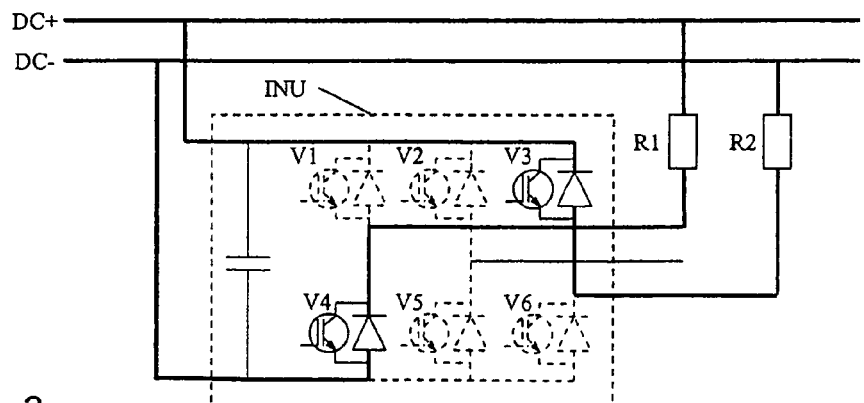
FIG. 3 presents a braking chopper according to the invention.

According to the present invention, the braking power handling capacity of the INU serving as a braking chopper is doubled by controlling one brake resistor by the lower-branch switch of only one phase and another brake resistor by the upper-branch switch of another phase as shown in FIG. 3. This is possible because the capacity of the power semiconductor switches in a braking chopper application is normally sufficient for one switch alone to control the same power that has traditionally been controlled by three switches in parallel. In the example circuit in FIG. 3, a lower-branch switch V4 controls a first resistor (R1), which is connected to the positive rail DC+, and an upper-branch switch V3 controls a second resistor (R2), which is connected to the negative rail DC−. In this way, the rails of both DC+ and DC− branches of the INU can be utilized in the braking, which also allows doubling of the maximal braking power.

The use of an INU unit as a braking chopper also enables several improvements regarding control techniques as compared to traditional technology:

1. Switches V3 and V4 can be controlled in push-pull mode with different pulse ratios, allowing more accurate control of braking power than in the traditional solution using only one resistor; with one resistor the braking power is either 100% or 0, but with two resistors the 50% power level is also available.

2. Since the INU unit comprises output current measure converters, the unit can perform a test with short pulses at the beginning of operation to determine how the resistors are connected.

For example, in the case of FIG. 3, when V1 is fired, no current flows, and when V4 is fired, a current flows towards the INU. From this it can be concluded that resistor R1 is connected between DC+ and the phase switch in question.

It is obvious to the person skilled in the art that different embodiments of the invention are not exclusively limited to the example described above, but that they may be varied within the scope of the claims presented below.

The invention claimed is:

1. A braking chopper for dissipating braking power away from the direct-current rails of an AC drive system, said braking chopper being an inverter unit (INU) consisting of upper- and lower-branch controllable semiconductor switches (V1–V6), wherein the inverter is connected by its output connectors to the direct-current rails (DC) via a resistor unit, characterized in that the resistor unit comprises two resistors (R1, R2), of which the first is connected to the positive direct-current rail (DC+) and the second to the negative direct-current rail (DC−), wherein both lower-branch and upper-branch semiconductor switches are turned on during braking, and wherein one brake resistor is controlled by the lower-branch switch of only one phase and the second brake resistor by the upper-branch switch of another phase.

2. A braking chopper according to claim 1, characterized in that the upper- and lower-branch semiconductor switches (V3, V4) are controlled in push-pull mode with different pulse ratios.

3. A braking chopper according to claim 1, characterized in that the switching instants of the switches of the first and the second phases are alternated for push-pull operation and the conduction-time pulse ratio is steplessly variable, so that power levels of 0, 50% and 100% are available.

4. A braking chopper according to claim 1, characterized in that the connection of the resistors is tested at the beginning of operation by turning one semiconductor switch at a time for a short time, e.g. 100 μs, and measuring the direction of current in the output connectors during the conduction time.

* * * * *